(12) United States Patent
Chang

(10) Patent No.: US 7,307,654 B2
(45) Date of Patent: Dec. 11, 2007

(54) IMAGE CAPTURE AND VIEWING SYSTEM AND METHOD FOR GENERATING A SYNTHESIZED IMAGE

(75) Inventor: Nelson Liang An Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1007 days.

(21) Appl. No.: 10/285,969

(22) Filed: Oct. 31, 2002

(65) Prior Publication Data

US 2004/0085451 A1    May 6, 2004

(51) Int. Cl.
*H04N 5/225*  (2006.01)
*H04N 17/02*  (2006.01)
*G06K 9/32*  (2006.01)

(52) U.S. Cl. .................. 348/218.1; 348/188; 382/294

(58) Field of Classification Search ................ 348/47, 348/187, 188, 218.1, 263, 333.11, 333.12; 382/294, 293, 295
See application file for complete search history.

(56) References Cited

U.S. PATENT DOCUMENTS

| | | | |
|---|---|---|---|
| 5,444,478 A * | 8/1995 | Lelong et al. ................. | 348/39 |
| 5,872,922 A | 2/1999 | Hogan et al. | |
| 6,005,633 A | 12/1999 | Kosugi | |
| 6,061,055 A | 5/2000 | Marks | |
| 6,124,881 A | 9/2000 | Terui et al. | |
| 6,147,709 A | 11/2000 | Martin et al. | |
| 6,173,069 B1 | 1/2001 | Daly et al. | |
| 6,184,926 B1 | 2/2001 | Khosravi et al. | |
| 6,195,116 B1 | 2/2001 | Lee | |
| 6,198,503 B1 | 3/2001 | Weinreich | |
| 6,208,372 B1 | 3/2001 | Barraclough | |
| 6,259,470 B1 * | 7/2001 | Koizumi et al. ........... | 348/14.1 |
| 6,286,756 B1 | 9/2001 | Stinson et al. | |
| 6,297,856 B1 | 10/2001 | Nakamura et al. | |
| 6,363,169 B1 * | 3/2002 | Ritter et al. ................. | 382/154 |
| 6,415,051 B1 * | 7/2002 | Callari et al. ............... | 382/154 |
| 6,674,461 B1 * | 1/2004 | Klapman ..................... | 348/42 |
| 6,724,417 B1 * | 4/2004 | Hillis et al. .............. | 348/14.16 |
| 6,768,509 B1 * | 7/2004 | Bradski et al. ........ | 348/207.99 |

(Continued)

FOREIGN PATENT DOCUMENTS

WO    WO0269272    9/2002

OTHER PUBLICATIONS

Seitz et al.; "Physically-Valid View Synthesis by Image Interpolation"; 1995; Appearing in Proc. Workshop on Representations of Visual Scenes; pp. 1-8.*

(Continued)

*Primary Examiner*—John M. Villecco

(57) ABSTRACT

An image capture and viewing system is disclosed. In one embodiment, the present invention provides an image capture system for providing an image of a subject. The image capture system includes a planar surface, a first camera, a second camera and a control module. The first camera is positioned to capture a first subject image of a subject positioned between the planar surface and the first camera. The second camera is spaced from the first camera. The second camera is positioned to capture a second subject image of the subject. The control module is configured to generate a synthesized image of the subject from a virtual view point using the relative positioning of the first camera, the second camera, and a planar surface.

30 Claims, 5 Drawing Sheets

U.S. PATENT DOCUMENTS

| | | | |
|---|---|---|---|
| 6,816,187 B1* | 11/2004 | Iwai et al. | 348/187 |
| 6,985,175 B2* | 1/2006 | Iwai et al. | 348/187 |
| 7,015,951 B1* | 3/2006 | Yoshigahara et al. | 348/207.99 |
| 7,023,473 B2* | 4/2006 | Iwai et al. | 348/187 |
| 2001/0019360 A1 | 9/2001 | Tanaka et al. | |
| 2003/0218672 A1* | 11/2003 | Zhang et al. | 348/14.16 |
| 2004/0104935 A1* | 6/2004 | Williamson et al. | 345/757 |
| 2005/0129325 A1* | 6/2005 | Wu | 382/254 |
| 2005/0232510 A1* | 10/2005 | Blake et al. | 382/275 |

OTHER PUBLICATIONS

Sawhney et al.; "Simplifying Multiple Motion and Structure Analysis Using Planar Parallax and Image Warping"; 1994; IEEE pp. 104-109.*

Hayashi, Masaki; "Image Compositing Based on Virtual Cameras"; Jan.-Mar. 1998; IEEE Multimedia; vol. 5, Issue 1; pp. 36-48.*

Seo et al.; "Calibration-Free Augmented Reality in Perspective"; Oct.-Dec. 2000; IEEE Transactions on Visualzation and Computer Graphics; vol. 6, No. 4; pp. 346-359.*

Makoto Kimura, Hideo Saito: "Interpolation of three views based on epipolar geometry" Visual Communications and Image Processing, Proceedings of SPIE, vol. 4310, 2001, pp. 218-227 XP002278292.

Kano H. et al: "Stereo Vision with Arbitrary Camera Arrangement and with Camera Calibration" Systems and Computers in Japan, Scripta Technical Journals. New York, Us, vol. 29 No. 2, Feb. 1, 1998, pp. 47-56 XP000752782.

Seitz S. M. et al: "View Morphing" Computer Graphics Proceedings 1996 (Siggaraph). New Orleans, Aug. 4, 1996, pp. 21-30, XP000682718.

Ramesh Raskar, Greg Welch, Matt Cutts, Adam Lake, Lev Stein, Henry Fuchs: "The office of the Future: A unified Approach to Image-Based Modeling and Spatially Immersive Displays" Computer Graphics Proceedings, Annual Conference Series, Siggraph 98, Jul. 19-14, 1998, p. 4, XP002278293.

* cited by examiner

IMAGE CAPTURE AND VIEWING SYSTEM AND METHOD FOR GENERATING A SYNTHESIZED IMAGE

THE FIELD OF THE INVENTION

The present invention relates to an image capture and viewing system, more particularly, to an image capture and viewing system generating and displaying synthesized images at virtual camera viewpoints positioned between at least two actual cameras.

BACKGROUND OF THE INVENTION

The use of dynamic presentations and training sessions has long since been a part of the business world. Live presentations and training sessions allow an entity to efficiently convey information to employees, business partners, or other entities with which it conducts business. As technology advances, more of the presentations and training sessions are being recorded in a multimedia format to allow viewers to access the presentation or session at the convenience of the viewing individual, thereby, eliminating many timing and scheduling difficulties. Often times, multimedia presentations include full motion video presentations which are displayed via a central processing unit. Storage of pertinent multimedia presentations within the central processing unit enables a user to easily access the presentations or training sessions of interest for viewing.

Typically, multimedia presentations are recorded by a single fixed video camera. Recording of multimedia presentations by a single fixed camera can create problems as a presentation or training session often contains more than one dynamic, region of interest. Different regions of interest may be of interest to the user in varying degrees at different times. A single fixed video camera, however, is not capable of capturing the presentation or session from multiple viewpoints in order to fully capture each region of interest. In response to such problems, multimedia presentations can be recorded by multiple fixed cameras spaced from each other around a periphery of the subject to be videoed. Storing the video images from the multiple video camera viewpoints into the central processing unit allows the user to toggle between video camera views as needed to view the region of interest at a particular time.

Although use of multiple cameras allows for the recording of more regions of interest, problems typically occur when the user desires to switch the display from one camera viewpoint to another. Upon user input to change the view displayed, the video image abruptly switches from one camera viewpoint to the other. The abrupt change in viewpoint is distracting and depending upon the camera spacing and the particular region of interest, may not allow viewing of the entire area of interest. For example, one camera may capture a part of the region of interest while another camera captures a different part of the region of interest. As a result, although both cameras present a partial view of the region of interest, neither camera is capable of displaying the entire region of interest at a satisfactory angle for optimum viewing by the user.

In light of the above mentioned problems, it would be desirable to have a method and system for manipulating the camera viewpoint of the image as it is viewed. More particularly, a need exists for a method and system in which a user can view and interactively control the viewpoint of the dynamic scene allowing for smooth transitions between cameras and full coverage of regions of interest of the presentation or scene.

SUMMARY OF THE INVENTION

The present invention is an image capture and viewing system. In one embodiment, the present invention provides an image capture system for providing an image of a subject. The image capture system includes a planar surface, a first camera, a second camera and a control module. The first camera is positioned to capture a first subject image of a subject positioned between the planar surface and the first camera. The second camera is spaced from the first camera. The second camera is positioned to capture a second subject image of the subject. The control module is configured to generate a synthesized image of the subject from a virtual view point using the relative positioning of the first camera, the second camera, and a planar surface.

DESCRIPTION OF THE PREFERRED EMBODIMENTS

In the following detailed description of the preferred embodiment, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
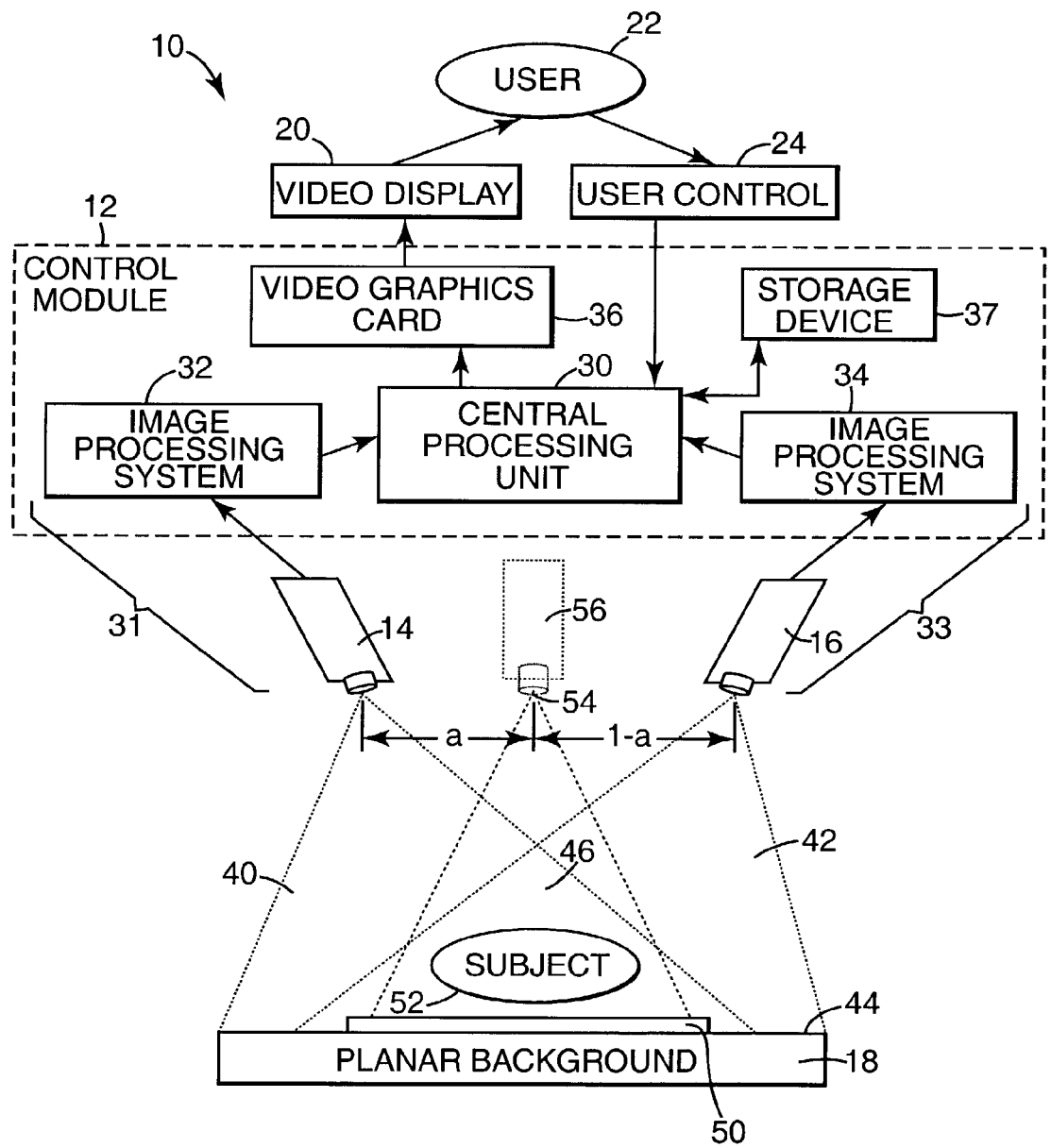
FIG. 1 is a block diagram illustrating one exemplary embodiment of a image capture and viewing system in accordance with the present invention.

FIG. 1 illustrates one exemplary embodiment of an image capture and viewing system of the present invention generally at 10. Image capture and viewing system 10 enables a subject to be captured by at least two cameras, the captured image to be analyzed, and the captured image to be sent to a user for viewing and interaction. The user may select a virtual viewpoint located between the two cameras in order to view a synthesized image corresponding to the virtual viewpoint selected.

Components of the present invention can be implemented in hardware via microprocessor, programmable logic, or state machine, in firmware, or in software with a given device. In one aspect, at least a portion of the software programming is web-based and written in HTML and JAVA programming languages, including links to user interfaces for data collection, such as a Windows based operating system, and each of the main components may communicate via a network using a communication bus protocol. In other embodiments, components of the present invention may not be web based, and are written in other programming languages (e.g., C or C++). For example, the present invention may or may not use a TCP/IP protocol suite for data transport, other programming languages and communication bus protocols suitable for use with the present invention will become apparent to those skilled in the art after reading the present application. Components of the present invention may also reside in software on one or more computer-readable mediums. The term "computer-readable medium" as used herein is defined to include any kind of memory, volatile, or non-volatile, such as floppy disk, hard disk, CD-ROMs, flash memory, read-only memory (ROM), and random access memory (RAM).

In one exemplary embodiment, image capture and viewing system 10 includes a control module 12, a first camera 14, a second camera 16, a planar background 18, a video display 20, and a user control 24. A user 22 interacts with the image capture and viewing system 10 via user control 24. In one preferred embodiment, control module 12 is coupled to first camera 14 and second camera 16. First and second cameras 14, 16 are directed toward planar background 18. Control module 12 is also coupled to video display 20 and user control 24. User 22 can view video display 20 and interact with the control module to control the images being viewed via user control 24.

Control module 12 is capable of receiving and storing multiple video images as well as seamlessly combining the images received into one synthesized image to be transferred to video display 20 for viewing. Control module 12 includes a central processing unit (CPU) 30, a first image or video capture device 32, a second image or video capture device 34, a video graphics card 36, and storage device 37. CPU 30 manages the overall operation and interaction between first and second video capture devices 32, 34 and video graphics card 36. As will be further discussed below, CPU 30 performs the calibration, analysis, and interpolation computations to derive a synthesized image. CPU 30 may be any processing unit capable of high-speed parallel operations as is known in the art. Storage device 37 allows for storage of multiple video images or other image data (e.g., image shape and color information), which may be later retrieved and synthesized. Storage device 37 can be a persistent storage device such as a hard disk drive.

Accordingly, CPU 30 is coupled to first image processing system 32, second image processing system 34, and video graphics card 36. First and second image processing systems 32, 34 facilitate the transfer of information from first and second cameras 14, 16, respectively, to CPU 30. In one aspect, image processing systems 32, 34 operate to translate video images captured via video cameras 14, 16 for use by CPU 30. In one aspect, image processing systems 32, 34 include hardware interface connections suitable for receiving video inputs from video cameras 14, 16. It should be noted that although illustrated as two discrete image processing systems 32, 34, a single image processing system having multiple ports to connect to first camera 14 and second camera 16 could be used and remains within the scope of the present invention. Video graphics card 36 facilitates the transmission of video images from CPU 30 to video display 20. Video graphics card 36 may comprise any commercially available video graphics card, but in one embodiment is a device controlled interface (DCI) adapted to stretch the synthesized video image on the video display 20 to remove any parallax distortions.

Image capture device 31 includes video camera 14. Image capture device 31 may include image processing system 32. Control module 12 includes image processing system 32. In another exemplary embodiment, image processing system 32 is separate from control module 12, and may be part of video camera 14. Similarly, image capture device 33 includes video camera 16. Image capture device 33 may include image processing system 34. Control module 12 includes image processing system 34. In another embodiment, image processing system is separate from control module 12, and may be part of video camera 16.

First camera 14 and second camera 16 are coupled to CPU 30 via first and second image processing systems 32, 34, respectively. Video cameras 14, 16 may be any commercially available image capture devices capable of generating digital video and/or photographic output. First camera 14 is spaced from second camera 16. First camera 14 has a first projection profile 40 indicating the area of image capture by first camera 14. Otherwise stated, only subjects positioned within first projection profile 40 can be captured as images by first camera 14. Similarly, second camera 16 has a second projection profile 42 indicating the area of possible image capture by second camera 16. First and second cameras 14, 16 are directed toward and located a sufficient distance away from planar background 18 that first and second projection profile 40, 42 cover the desired area of image capture. Planar background 18 is any background having a front planar surface 44 facing the first and second cameras 14, 16. In one exemplary embodiment the planar surface 44 is a monolithic color. The area in which first projection profile 40 and second projection profile 42 overlap is an area of dual coverage 46. Only items located within area of dual coverage 46 are available to have a synthesized view derived from the images captured by first camera 14 and second camera 16. In this respect, in one exemplary embodiment, first and second cameras 14, 16 are positioned such that all subjects to be captured lie within area of dual coverage 46.

Image capture and viewing system 10 further includes video display 20 coupled to CPU 30 via video graphics card 36. Video display 20 may include a commercially available monitor, including a standard VGA computer monitor. Video display 20 functions to visually relay images stored and derived by CPU 30 to user 22. User 22 interacts with CPU 30 to control the precise image displayed on video display 20 via user control 24. User control 24 may include a keyboard, a mouse, and/or other computer input device known in the art.

Figure 2:
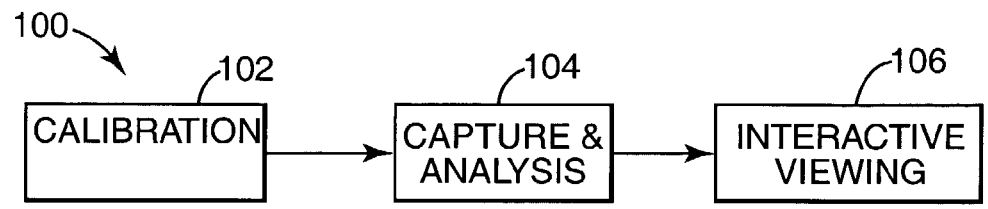
FIG. 2 is a flow diagram illustrating one exemplary embodiment of an image capture and viewing method in accordance with the present invention.

FIG. 2 generally illustrates one exemplary embodiment of an image capture and viewing method utilizing image capture and viewing system 10, at 100. Image capture and viewing method 100 includes a calibration process 102 of image capture and viewing system 10, a capture and analysis process 104 of video images collected by first camera 14 and second camera 16, and interactive viewing process 106 by user 22.

Figure 3:
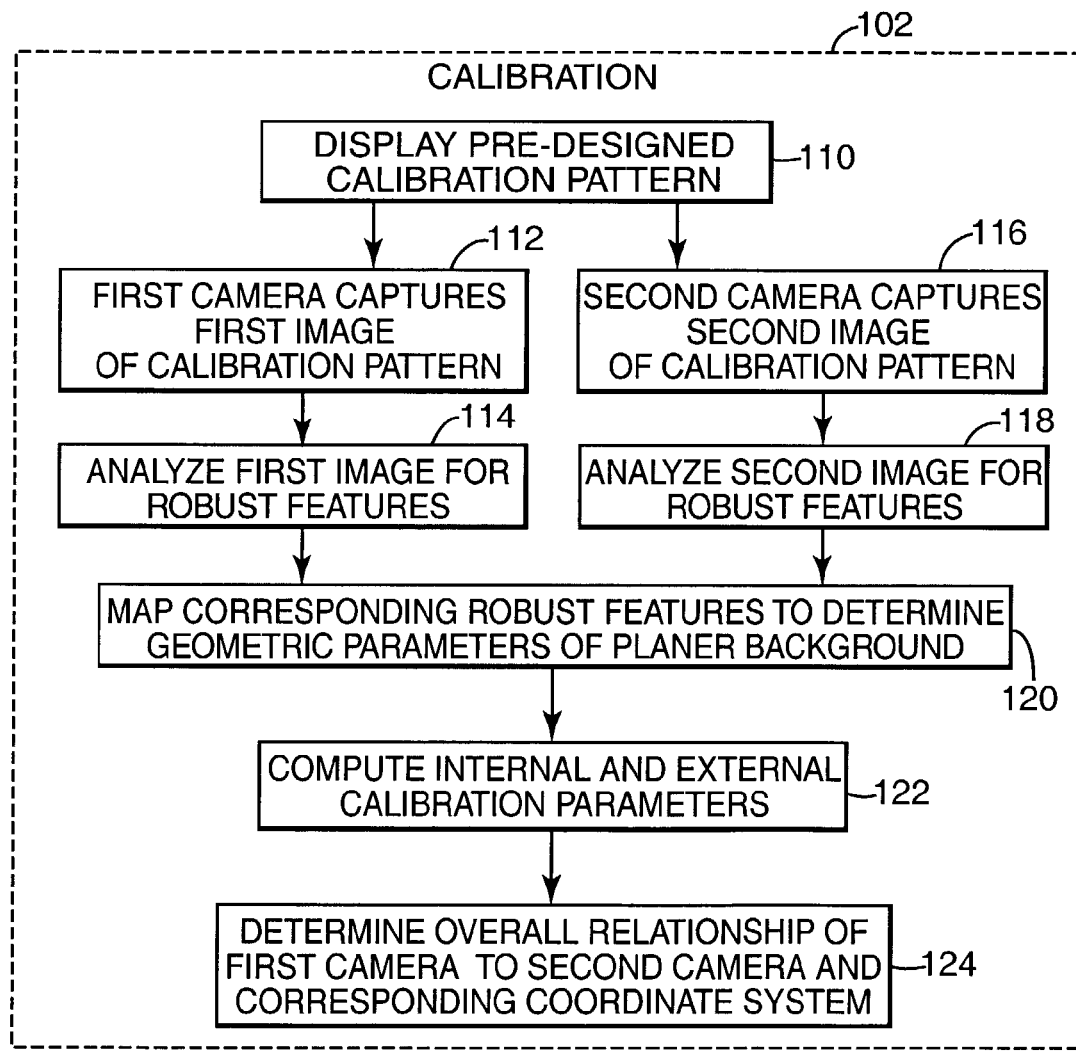
FIG. 3 is a flow diagram illustrating one exemplary embodiment of the calibration step of FIG. 2.

FIG. 3 is a flow diagram illustrating one exemplary embodiment of calibration process 102 according to the present invention. Reference is also made to FIG. 1. At 110, a predesigned calibration pattern 50 is displayed in front of planar background 18 (i.e. on front planar surface 44). Preferably, calibration pattern 50 is positioned primarily within dual area of coverage 46. Calibration pattern 50 is a predesigned pattern, such as a checkerboard pattern, on a planar surface having robust features, such as the corners of the checker board rectangles, to be identified by CPU 30. The size and attributes of calibration pattern 50 have been previously entered into and are known by CPU 30. At 112, first camera 14 captures a first image of calibration pattern 50. The first image is transmitted to CPU 30 via first video capture device 32. At 114, CPU 30 analyzes the first image to locate the captured robust features of calibration pattern 50. At 116, second camera 16 captures a second image of calibration pattern 50. The second image is transferred from second camera 16 to CPU 30 via second video capture device 34. CPU analyzes the second image for the robust features of calibrated pattern 50. Preferably, blocks 112 and 116 occur simultaneously, and blocks 114 and 118 occur simultaneously or near simultaneously.

At 120, CPU 30 compares the robust features from the first and second images to the known characteristics of calibration pattern 50 and performs a correspondence mapping. Correspondence mapping entails locating each captured robust characteristic of calibration pattern 50 in first image 14 and noting the spatial relationship of the captured robust characteristics. The spatial relationships between the characteristics in the first image are compared to the predetermined actual spacing of the robust characteristics on calibration pattern 50 to produce the mapped correspondence information. Since the calibration pattern 50 is a planar surface located upon planar background 18, the geometric parameters of planar background with respect to first camera 14 are directly computed from the mapped correspondence information. A similar correspondence mapping procedure is completed using the second image to determine the geometric parameters of planar background 18 with respect to second camera 16. In one exemplary embodiment, the geometric parameters for each camera are expressed as a homography matrix.

At 122, the correspondence mapping and geometric parameters of planar background 18 determined at 120 are utilized to compute both internal and external calibration parameters of first camera 14 and second camera 16. The internal calibration parameters include but are not limited to the focal length and lens distortion of each camera. The external calibration parameters include the relative position and orientation of first and second cameras 14, 16 with respect to one another and with respect to planar background 18. After all calibration parameters are determined, the overall spatial relationship of first camera 14, second camera 16, and planar background 18 is determined at 124 based upon the calibration parameters of each camera. The overall spatial relationship of first camera 14, second camera 16, and planar background 18 is used to determine a first coordinate system with respect to first camera 14 and a second coordinate system with respect to second camera 16. Once the two coordinate systems are derived, the calibration process is complete. The calibration process needs to be performed only once, as long as the camera locations (i.e., first camera 14 and second camera 16) are fixed relative to the planar surface of planar background 18.

Figure 4:
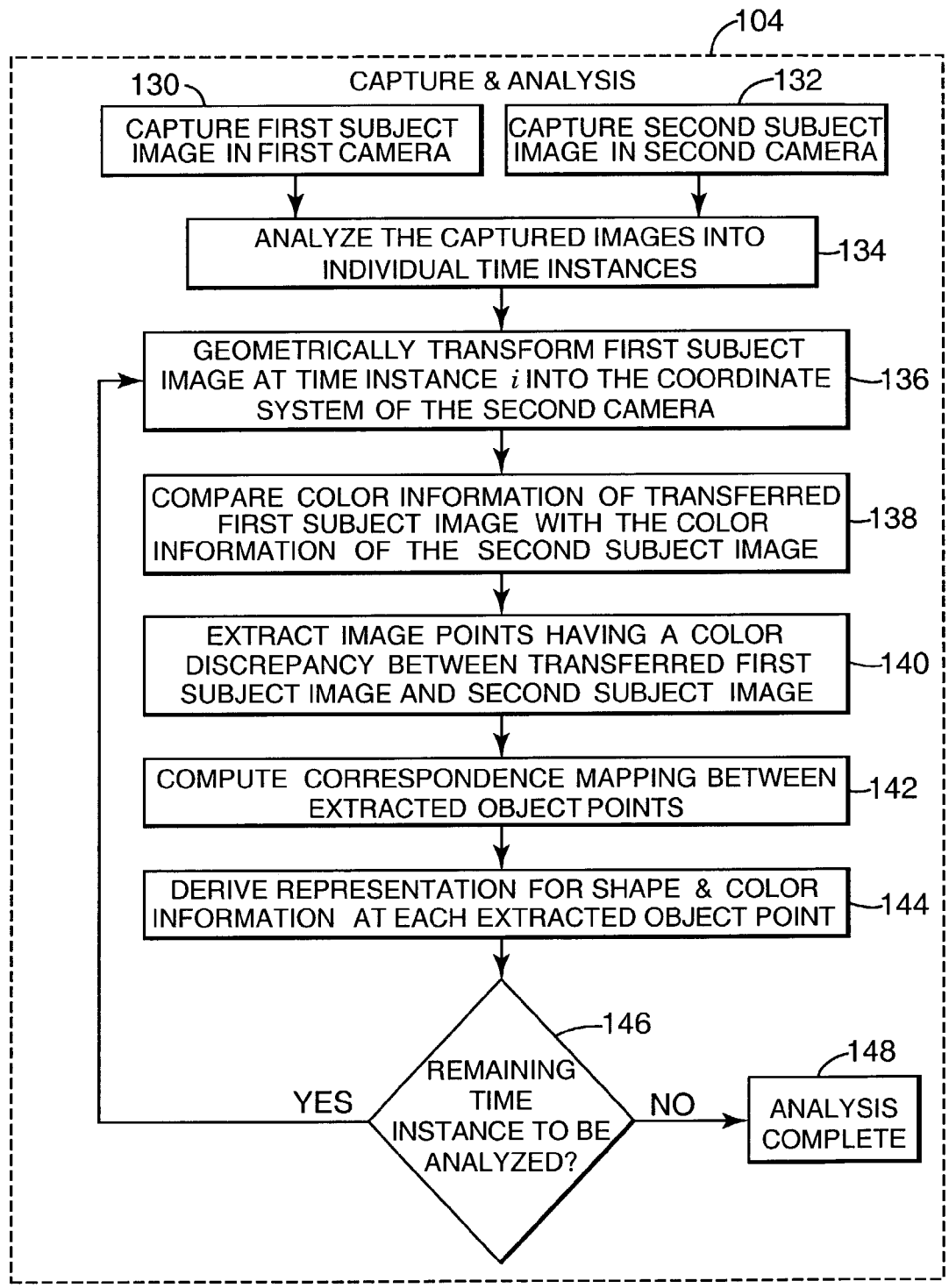
FIG. 4 is a flow diagram illustrating one exemplary embodiment of the capture and analysis step of FIG. 2.

In one embodiment, upon completion of calibration step 102, calibration pattern 50 is removed from planar background 18 and replaced by a subject 52 of the presentation or a scene to be recorded. Once subject 52 is in place, capture and analysis step 104 begins. One exemplary embodiment of capture and analysis step 104 in accordance with the present invention is generally illustrated in the flow diagram of FIG. 4. At 130, first camera 14 captures a first subject image of the portion of subject 52 and planar background 18 positioned within first projection profile 40. In one preferred embodiment, the entire subject is positioned within first projection profile 40. The first subject image or video is recorded by first camera 14 and transferred to CPU 30 via first video capture device 32. In step 132, which occurs simultaneously with step 130, second camera 16 captures a second subject image or video of the portion of subject 52 and planar background 18 positioned within second projection profile 42. In one preferred embodiment, the entire subject is positioned within second projection profile 42. The second subject image is transferred to CPU 30 via second video capture device 34.

At 134, the first subject image and the second subject image are analyzed over a time period (e.g., the duration of the "event" or presentation), by dividing the time period into individual time instances or moments. The analysis proceeds at every time instance until the time period is over. At 136, the first subject image at first time instance i is geometrically transformed into the coordinate system of second camera 16 based upon the overall spatial relationships obtained during calibration 102. Specifically, if planar background 18 is represented by the 3×3 matrix M, with element m_ij at row i and column j of matrix M, then the visual characteristics, such as color, for the first subject image located at individual pixel (u,v) in the coordinate system of first camera 14 are moved to location (u',v') in the coordinate system of second camera 16 by the following formulas:

$$u'=(m\_11*u+m\_12*v+m\_13)/(m\_31*u+m\_32*v+m\_33)$$

$$v'=(m\_21*u+m\_22*v+m\_23)/(m\_31*u+m\_32*v+m\_33)$$

Once the first subject image is transferred to the coordinate system of second camera 16 it becomes a transferred first subject image.

At 138, the color information of each pixel in the transferred first subject image is compared with the color information of each corresponding pixel in the second subject image at the same time instance i. Discrepancies in color between the pixel of the transferred first subject image and the corresponding pixel of the second subject image indicate points that either do not lie on the surface of planar background 18 or are occluded in one subject image. Points that do not lie on the surface of planar background 18 correspond to subject 52 in front of the planar background 18, for example, the presenter, members of the scene, or visual aids. At 140, points having a color discrepancy between the transferred first subject image and the second subject image are extracted from the overall image and classified as extracted object points. Notably, only the extracted object points are further analyzed, thereby reducing the amount of analysis to be performed on each frame at each individual time instance.

At 142, correspondence mapping is computed between the extracted object points. In general, block 142 includes mapping the shape and color properties of each pixel in each image onto the coordinate system corresponding to the camera on which the particular image was captured. For example, correspondence mapping is computed between the first subject image and the second subject image for the extracted object points. Each extracted object point in the first subject image is mapped in the coordinate system of the first camera 14. Once the coordinates of the extracted object points are determined with respect to first camera 14 they are coupled with the coordinates of the same extracted object point with respect to the second camera 16.

Various approaches may be used to perform correspondence mapping for the extracted object points. Suitable approaches include maximizing correlation, volumetric techniques, model-based stereo, and other approaches known in the art. Points in one subject image that are not adequately matched to points in the second subject image are identified as occluded points and are assumed to belong to the planar surface. At 144, representations for the information mapped for each extracted object point in block 142 are derived. Such representations allow for later interpolation of images located between the first subject image and the second subject image. There are various methods of representation that may be used such as depth values, motion vectors for every pixel, or other methods as are known in the art. At 146, it is determined whether or not there are remaining time instances of the first and second subject images within the time period that remain to be analyzed. If there are remaining time instances to be analyzed, blocks 136 through 146 are repeated as necessary. If there are no remaining time instances within the time period to be analyzed, then the time period is over and the analysis is complete as is shown in block 148. Optionally, image data (e.g., video images, image shape and color information) is stored in storage device 37 and available for use at a later time.

The analysis process (134 to 148) can be repeated in the opposite direction, e.g. identify object points in the second subject image, determine mapping from the second subject image to the first subject image, etc. The extracted object points as well as the mapping for the extracted object points, should be consistent in both directions. Extracted object points that are deemed inconsistent are considered as occluded points. The bi-directional matching improves the robustness of the analysis but requires more time to complete, thereby slowing down the overall process.

Figure 5:
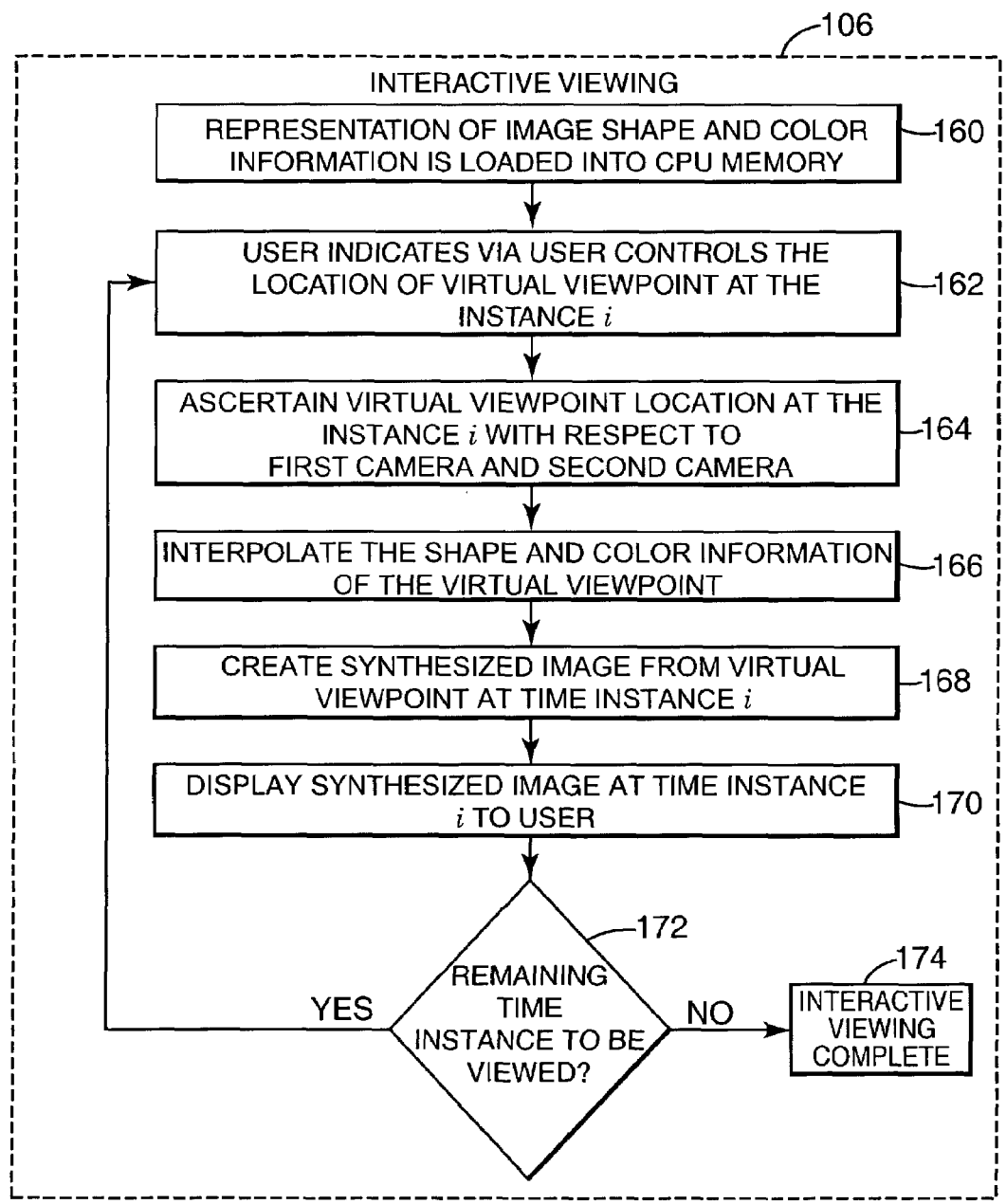
FIG. 5 is a flow diagram illustrating one exemplary embodiment of the interactive viewing step of FIG. 2.

Upon completion of analysis 104, interactive viewing 106 may be performed. One exemplary embodiment of interactive viewing 106 in accordance with the present invention is illustrated generally by the flow diagram of FIG. 5. Reference is also made to FIG. 1. At block 160 of interactive viewing 106, the representations of image shape and color information are loaded into the memory of CPU 30. At 162 user 22 viewing the subject image indicates via user control 24 a virtual viewpoint 54 at time instance i. Virtual viewpoint 54 is a point located between first camera 14 and second camera 16 representing where a virtual camera 56 would have been located in order to actually capture the synthesized image to be created by CPU 30. In one aspect, a user can simply click-and-drag a mouse corresponding to video display 20 to simulate shifting between first camera 14 and second camera 16 to indicate the desired location of virtual viewpoint 54. At a particular time instance i, a user may indicate the virtual viewpoint to be the same as the preceding time instance by not moving the mouse or user control 24 to indicate a changing position of virtual viewpoint 54 from the preceding time instance i.

At block 164, the location of virtual viewpoint 54 between first camera 14 and second camera 16 is determined and utilized to derive an interpolation parameter a at the time instance i. Interpolation parameter a is the distance between first camera 14 and virtual viewpoint 54 divided by the total distance between first camera 14 and second camera 16. After determination of interpolation parameter a, the distance between first camera 14 and second camera 16 is considered to be equal to one for the remaining interpolation calculations. As a result, the distance between virtual viewpoint 54 and second camera 16 is equal to 1−a.

At 166, the shape and color information of each pixel of virtual viewpoint 54 is interpolated from the representation of all points in the subject image including the correspondence mapping information of first subject image and second subject image based upon the location of virtual viewpoint 54 with respect to first camera 14 and second camera 16. In one embodiment, to create the synthesized image, CPU 30 computes new shape and color information given interpolation parameter a. Let $p\_1$ represent the pixel coordinates of a particular point of first subject image having a color equal to $c\_1$ at a particular instance i, and $p\_2$ represents the pixel coordinates of the corresponding point in second subject image having a color $c\_2$ at the particular instance i. Then, this point appears in the synthesized view at location p' with color c' given by the following equations:

$$p'=(1-a)*p\_1+a*p\_2$$

$$c'=(1-a)*c\_1+a*c\_2$$

This interpolation is first performed for all image pixels corresponding to the planar surface where the correspondence mapping is given by the 3×3 homography M. Then, interpolation is performed for extracted object points. This creates a back-to-front rendering order and ensures that the subject (e.g. presenter) is drawn in front of the planar surface in the virtual image.

At 168, the interpolated values are used to create a synthesized image, an image not originally captured, from virtual viewpoint 54 at time instance i. It should be noted that for faster rendering, parameter a can be quantized to a fixed number of levels allowing use of fast bit operations instead of possibly more costly floating point operations. In other words, by limiting the possible locations of virtual camera 56, less computations need be performed resulting in faster rendering. However, this may not allow for a truly seamless a transition between first camera 14 and second camera 16 or to the virtual camera 56. In block 170, the created synthesized image for time instance i is relayed from CPU 30 to video display 20 via video graphics card 36 for viewing by user 22.

At 172 CPU 30 analyzes whether there is a remaining time instance to be viewed in the first or second subject images, within the desired time period. If a time instance remains to be viewed, steps 162 through step 172 are repeated as necessary. If no time instances remain to be viewed, the interactive viewing process is complete as noted in step 174.

Figure 6:
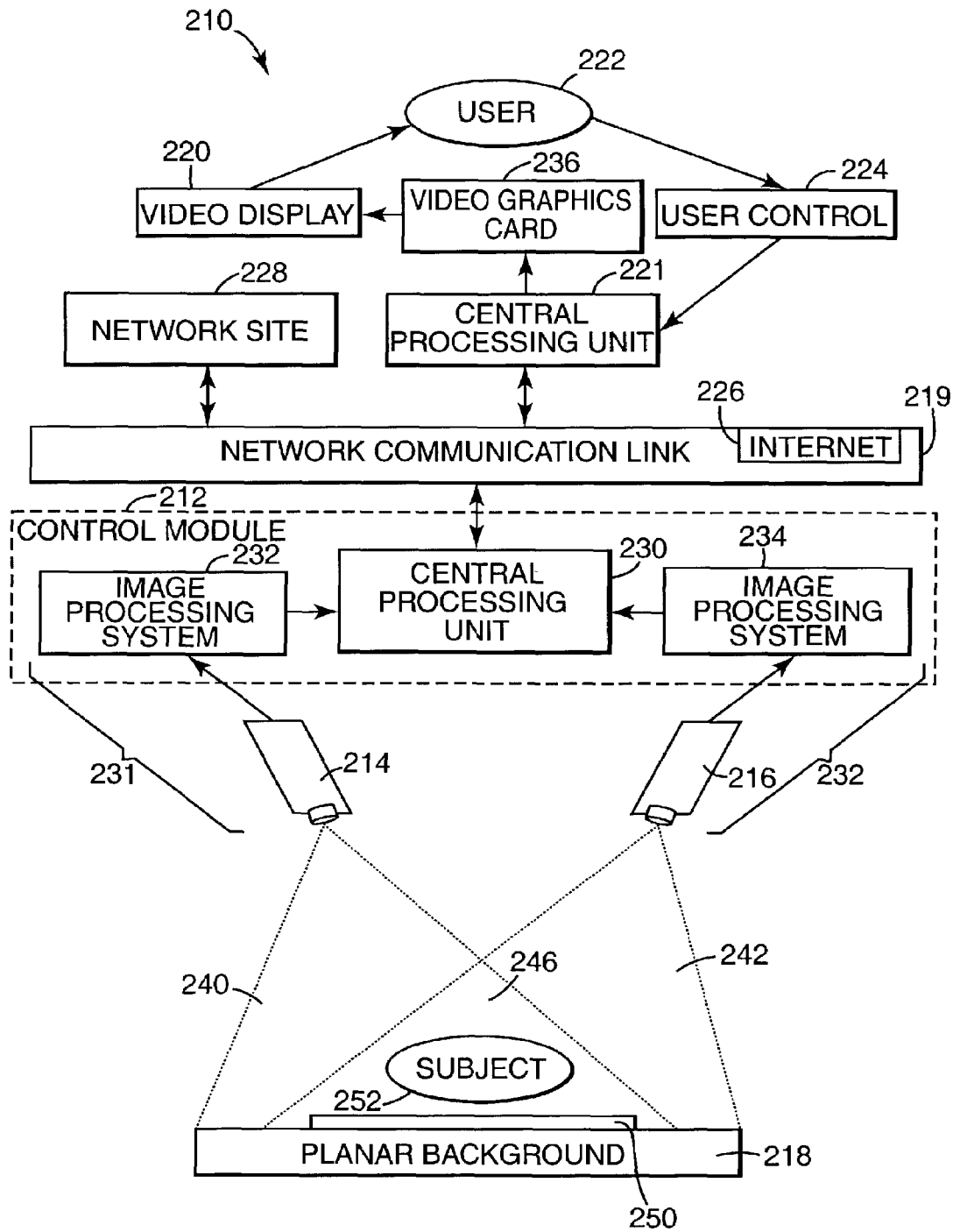
FIG. 6 is a block diagram illustrating another exemplary embodiment of an image capture and viewing system in accordance with the present invention.

FIG. 6 generally illustrates another exemplary embodiment of an image capture and viewing system capable of performing the image capture and viewing method 50 in accordance with the present invention at 210. Image and capture viewing system 210 includes a control module 212, a first camera 214, a second camera 216, a planar background 218, a network communication link 219, a second central processing unit (second CPU) 221, a video display 220, and user control 224. A user which interacts with system 210 is represented at 222. Control module 212 is capable of receiving and storing multiple video images as well as seamlessly combining the images received into one synthesized image to be transferred to video display 220. Control module 212 includes a first central processing unit (CPU) 230, a first image processing system 232, and a second image processing system 234. CPU 230 interacts with first image processing system 232 and second image processing system 234 in a similar manner as described above for CPU 30 and first and second image processing systems 32, 34. First image processing system 232 is coupled to first camera 214 to facilitate the transfer information from the first camera 214 to CPU 230. Similarly, second image processing system 234 is coupled to second camera 216 to facilitate the transfer of information from second camera 216 to CPU 230. Although two discrete image processing systems 232, 234 are shown, a single image process system having multiple input ports to be coupled with first camera 214 and second camera 216 may be used.

As described above with respect to FIG. 1, first camera 214 and second camera 216 are directed towards and positioned a sufficient distance from planar background 218, such that a subject 252 to be recorded falls within the first and second cameras 214, 216 dual area of coverage 246. More particularly, a first projection profile 240 of first camera 214 covers the portion of subject 252 and of planar background 218 desired to be captured in a first image. Accordingly, second camera 16 is positioned such that the portion of subject 252 and planar background 218 desired to be captured in a second subject image fall within a second projection profile 242 of second camera 216. Furthermore, first projection profile 240 overlaps second projection profile 242 to form area of dual coverage 246. As described above with respect to area of dual coverage 46, area of dual coverage 246 represents the area of coverage in which a synthesized image may be rendered from a virtual viewpoint between first camera 214 and second camera 216.

Referring again to FIG. 6, control module 212 is coupled to second CPU 221 via network communication link 219. Network communication link 219, as used herein, is defined to include a communication link such as an Internet communication link, an intranet communication link, or similar high-speed communication link. In one preferred embodiment, network communication link 219 includes an Internet communication link 226. In addition, network communication link 219 may include a wireless communication link. Furthermore, network communication link 219 may include a network site 228 for a temporary or permanent storage of the image shape and color information representations to be accessed by second CPU 221 without access to CPU 230.

Second CPU 221 is connected to video display 220 via video graphics card 236. A user 222 can view the images on video display 220 and simultaneously control the images displayed on video display 220 via user control 224, which is coupled to second CPU 221. Second CPU 221 manages the overall interaction between network communication link 219, video graphics card 236, and user control 224. Second CPU 221 is a processing unit capable of high speed parallel operations. Video display 220, video graphics card 236, and user control 224 are similar to video display 20, video graphics card 36, and user control 24, respectively, as described above.

Control module 212, first camera 214, second camera 216, and planar background 218 perform calibration 102 and capture and analysis 104, as illustrated in FIG. 2, in a similar manner as described above with respect to control module 12, first camera 14, second camera 16, and planar background 18. First camera 214 and second camera 216 are part of an image capture device 231, 233 similar to the image capture devices 31, 33 of FIG. 1.

Image and capture viewing system 210 performs interactive viewing 106 of the image and capture viewing method 100 in much the same way as image capture and viewing system 10. However, in one exemplary embodiment of block 140, the representation information gained in capture and analysis 104 is not merely loaded into the memory of CPU 230. Rather, upon loading of the image shape and color representations into CPU 230, the representations are copied from the memory of CPU 230 to the memory of second CPU 221 via network communication link 219.

Network communication link 219 allows synthesized images to be viewed by a user from a remote location (e.g., another country). Further, CPU 221 is also locatable remote from control module 212. This allows multiple camera systems at multiple locations to utilize a single CPU 221, in which images can be broadcast virtually anywhere reachable via communication link 219.

In another exemplary embodiment, the shape and color representations are sent from CPU 230 via network communication link 219 to network site 228. The representations stored in network site 228 are later accessed and/or downloaded from network communication link 219 to second CPU 221 to complete step 106. Upon loading of representation information into second CPU 221, steps 142 through 152 are completed by second CPU 221, video display 220, user 222, and user controls 224 in a similar manner as described above for CPU 30, video display 20, user 22, and user control 24.

Although image capture and viewing systems 10, 210 and image capture and viewing method 100 have been described with respect to two cameras, similar systems and methods incorporating more than two cameras are within the scope of the present invention. Each of the additional cameras (not shown) can be spaced from first camera 14, 214, second camera 16, 216, and any other additional camera such that the additional projection profiles create additional areas of dual coverage for which a synthesized image may be derived. Additional cameras may be spaced along the same horizontal as other cameras to increase the breadth of total images captured and the area available for image synthesis. In one exemplary embodiment, the cameras are evenly spaced along a single horizontal plane about the periphery of the scene to be captured. As such the synthesized image derived may be a product of the actual images captured by first and second cameras 14, 214 and 16, 216, second camera 16, 216 and a third camera, or the third camera and a fourth camera depending upon the position of the user defined virtual viewpoint along the camera horizontal.

Additionally, first camera 14, 214, second camera 16, 216, and additional cameras may be placed at varying heights with respect to each other to increase the overall height available for virtual camera positioning. It should further be noted that additional cameras may be positioned such that one or more additional projection profiles overlap the existing dual area of coverage 46, 246. Cameras so placed and the images captured thereby may be incorporated into image capture and viewing method 100 by performing additional iterations substantially similar to the iterations performed in method 100 as will be apparent to those of ordinary skill in the art. Note that such positioning may allow a user to vary the virtual viewpoint position in multiple dimensions.

The image capture and viewing systems and methods described herein provide for an efficient method of capturing presentations, training sessions, or other dynamic scenes using fixed cameras without sacrificing the ability of a user to view the presentation, training session, or other dynamic scene from multiple angles or viewpoints. The use of multiple cameras and interpolation techniques to produce a synthesized image from a user selected virtual viewpoint allows for a smoother transition between actual camera images. The smooth transition prevents abrupt camera angle changes, which are distracting to users. Furthermore, the ability to create synthesized images allows the user to select the most satisfactory angle to view the scene in order to better ensure that the specific region of interest at a particular time instance is accessible to the user.

Although specific embodiments have been illustrated and described herein for purposes of the description of the preferred embodiment, it will be appreciated by those of ordinary skill in the art that a wide variety of alternate and/or equivalent implementations may be substituted for specific embodiments shown and described without departing from the scope of the present invention. Those with skill in the chemical, mechanical, electromechanical, electrical, and computer arts will readily appreciate that the present invention may be implemented in a wide variety of embodiments. This application is intended to cover any adaptations or variations of the preferred embodiments discussed herein. Therefore, it is manifestly intended that this invention be limited only by the claims and equivalents thereof.

What is claimed is:

1. An image capture system for providing an image of a subject comprising:
   a single, fixed planar surface of a planar background;
   a first camera positioned to capture a first subject image of a live subject positioned between the single, fixed planar surface and the first camera;
   a second camera spaced from the first camera, the second camera positioned to capture a second subject image of the live subject located between the single, fixed planar surface and the second camera; and
   a control module configured to generate a synthesized image of the live subject from a virtual viewpoint using a fixed, relative position of the first camera, the second camera, and only the single, fixed planar surface,
   wherein the first camera, the second camera, and the single, fixed planar surface have the same fixed relative position during a calibration of the first camera and the second camera.

2. The image capture system of claim 1, further comprising:
   a first image capture device, wherein the first subject image is captured from the first camera via the first image capture device; and
   a second image capture device, wherein the second subject image is captured from the second camera via the second image capture device.

3. The image capture system of claim 2, wherein the control module is configured to generate a first coordinate set with respect to the first camera and a second coordinate set with respect to the second camera, the first coordinate set adapted to be converted into the second coordinate set.

4. The image capture system of claim 2, further comprising:
   calibration settings stored within the control module, used to determine the fixed relative position of the first camera, the second camera, and the single, fixed planar surface.

5. The image capture system of claim 4, further comprising:
   a calibration pattern temporarily positioned on the planar surface, the calibration pattern having a plurality of robust features;
   a first calibration image of the calibration pattern generated from the first camera via the first image capture device; and
   a second calibration image of the calibration pattern generated from the second camera via the second image capture device;
   wherein the control module determines the calibration settings using the first calibration image, the second calibration image, and the robust features of the calibration pattern to determine the fixed relative position of the first camera, the second camera, and the single, fixed planar surface.

6. The image capture system of claim 1, wherein the first central processing unit is configured to generate the synthesized image at an individual time instance.

7. The image capture system of claim 1, wherein the first central processing unit is configured to generate the synthesized image at a plurality of consecutive time instances.

8. The image capture system of claim 1, further comprising:
   a control unit in communication with the control module, adapted to allow a user to select the location of the virtual viewpoint.

9. The image capture system of claim 1, further comprising:
   an image display coupled to the control module, the image display adapted to allow the user to view at least one of the synthesized image, the first subject image, or the second subject image.

10. An image capture system comprising:
    a planar background having a single, fixed planar surface;
    a plurality of cameras including:
      a first camera positioned to capture a first subject image of a live subject positioned between the single, fixed planar surface of the planar background and the first camera;
      a second camera spaced from the first camera, the second camera positioned to capture a second subject image of the subject; and
    a first central processing unit coupled to each of the plurality of cameras, the first central processing unit configured to utilize a fixed relative position of the first camera, the second camera, and only the single, fixed planar surface of the planar background to convert the first subject image and the second subject image into a synthesized image of the live subject from a virtual viewpoint, wherein the virtual viewpoint is positioned between the first camera and the second camera,
    wherein the first camera, the second camera, and the single, fixed planar surface have the same fixed relative position during a calibration of the first camera and the second camera.

11. The image capture system of claim 10 wherein the first central processing unit is configured to generate a first coordinate series with respect to the first camera and a second coordinate with respect to the second camera, the first coordinate adapted to be converted into the second coordinate.

12. The image capture system of claim 10, further comprising:
    a calibration pattern temporarily positioned on the single, fixed planar surface of the planar background, the calibration pattern having a plurality of robust features; and
    wherein the first camera is configured to capture a first calibration image of the calibration pattern and the second camera is configured to capture a second calibration image of the calibration pattern, the first central processing unit having a memory of the robust features and being adapted to utilize the first calibration image, the second calibration image, and the robust features to determine the fixed relative position of the first camera, the second camera, and the single, fixed planar surface of the planar background.

13. The image capture system of claim 10, wherein the first central processing unit is configured to generate the synthesized image at an individual time instance.

14. The image capture system of claim 10, wherein the first central processing unit is configured to generate the synthesized image at a plurality of consecutive time instances.

15. The image capture system of claim 10, further comprising:
a controller unit coupled to the first central processing unit, the controller unit adapted to allow a user to select the location of the virtual viewpoint.

16. The image capture system of claim 10, further comprising:
an image display coupled to the first central processing unit, the image display adapted to allow the user to view at least one of the synthesized image, the first subject image, or the second subject image.

17. The image capture system of claim 10, further comprising:
a network communication link coupled to the first central processing unit; and
a second central processing unit coupled to the network communication link;
a controller unit coupled to the second central processing unit, the controller unit adapted to allow a user to select the location of the virtual viewpoint; and
an image display coupled to the second central processing unit, the image display adapted to allow the user to view at least one of the synthesized image, the first subject image, or the second subject image.

18. A method of viewing synthesized images derived from actual images, the method comprising:
providing a plurality of visual characteristics for a first subject image of a live image and a second subject image of a live image, the first subject image being captured by a first camera and the second subject image being captured by a second camera spaced from the first camera, wherein the first subject image is related to the second subject image based on a predetermined spatial relationship of each respective first and second camera relative to a single, fixed planar surface of a planar background;
calibrating the first and second camera while maintaining the same fixed relative position of the first camera, second camera, and the single, fixed planar surface;
selecting a virtual viewpoint positioned between the first camera and the second camera;
generating a synthesized image by interpolating a plurality of visual characteristics of the synthesized image from the plurality of visual characteristics of the first subject image and the second subject image based on a position of the virtual viewpoint with respect to the first camera the second camera, and the single, fixed planar surface of a planar background wherein the synthesized image represents an image that would have been captured from the virtual viewpoint; and
displaying the synthesized image to a user.

19. The method of claim 18, wherein the first image and the second image provided represent an individual time instance.

20. The method of claim 19, wherein providing a plurality of visual characteristics, selecting a virtual viewpoint, generating a synthesized image, and displaying the synthesized image are repeated for a plurality of individual time instances.

21. The method of claim 18, wherein generating a synthesized image by interpolating the visual characteristics of the synthesized image includes:
determining an interpolation parameter based upon the location of the virtual viewpoint with respect to the first camera and the second camera;
deriving the visual characteristics of the synthesized image using the interpolation parameter and the visual characteristics of the first subject image and the second subject image.

22. A computer-readable medium having computer-executable instructions for performing a method of viewing synthesized images derived from actual images comprising:
providing a plurality of visual characteristics for a first subject image of a live image and a second subject image of a live image, the first subject image being captured by a first camera and the second subject image being captured by a second camera spaced from the first camera, wherein the first subject image is related to the second subject image based on a predetermined spatial relationship of each respective first and second camera relative to a single, fixed planar surface of a planar background;
calibrating the first and second camera while maintaining the same fixed relative position of the first camera, second camera and the single, fixed planar surface;
selecting a virtual viewpoint positioned between the first camera and the second camera;
generating a synthesized image by interpolating a plurality of visual characteristics of the synthesized image from the plurality of visual characteristics of the first subject image and the second subject image based on a position of the virtual viewpoint with respect to the first camera, the second camera, and the single, fixed planar surface of a planar background wherein the synthesized image represents an image that would have been captured from the virtual viewpoint; and
displaying the synthesized image to a user.

23. A computer-readable medium having computer-executable instructions for performing a method of image capture for generation of a synthesized image comprising:
directing a plurality of cameras toward a planar background, wherein the plurality of cameras includes a first camera and a second camera spaced from the first camera;
capturing a first calibration image with the first camera, the first calibration image being of a calibration pattern, the calibration pattern having a plurality of known robust features and being positioned on the planar background;
capturing a second calibration image with the second camera, the second calibration image being of the calibration pattern;
determining a spatial relationship between the first camera, the second camera, and the planar background by analyzing the first calibration image and the second calibration image with respect to the robust features of the calibration pattern;
placing a subject between the planar background and the first and second cameras;
capturing a first subject image of the subject with the first camera and a second subject image of the subject with the second camera;
comparing each point in the first subject image to a corresponding object point of the second subject image for a color discrepancy, any object points having the color discrepancy are classified as an extracted object point; and
deriving a representation of the shape and color for each of the extracted object points.

24. A method of image capture for subsequent generation of a synthesized image, the method comprising:
- directing a plurality of cameras toward a planar background, wherein the plurality of cameras includes a first camera and a second camera spaced from the first camera;
- capturing a first calibration image with the first camera, the first calibration image being of a calibration pattern, the calibration pattern having a plurality of known robust features and being positioned on the planar background;
- capturing a second calibration image with the second camera, the second calibration image being of the calibration pattern;
- determining a spatial relationship between the first camera, the second camera, and the planar background by analyzing the first calibration image and the second calibration image with respect to the robust features of the calibration pattern;
- placing a subject between the planar background and the first and second cameras;
- capturing a first subject image of the subject with the first camera and a second subject image of the subject with the second camera;
- comparing each point in the first subject image to a corresponding object point of the second subject image for a color discrepancy, any object points having the color discrepancy are classified as an extracted object point; and
- deriving a representation of the shape and color for each of the extracted object points.

25. The method of claim 24, wherein determining a spatial relationship between the first camera, the second camera, and the planar background includes:
- examining the first calibration image and the second calibration image for the robust features of the calibration image;
- comparing a spatial relationship of the robust features in the first calibration image to the spatial relationship of the robust features in the calibration pattern;
- determining the spatial relationship of the first camera to the planar background;
- comparing the spatial relationship of the robust features in the second calibration image to the spatial relationship of the robust features in the calibration pattern;
- determining the spatial relationship of the second camera to the planar background.

26. The method of claim 25, wherein determining a spatial relationship between the first camera, the second camera, and the planar background further includes:
- determining the relationship of the first camera to the second camera utilizing the relationship of the first camera to the planar background and the relationship of the second camera to the planar background.

27. The method of claim 24, wherein the corresponding object point of the second image is determined using the known spatial relationship between the first camera, the second camera, and the planar background.

28. The method of claim 24, further comprising:
- dividing the first subject image and the second subject image over a time period into a plurality of individual time instances.

29. The method of claim 28, wherein converting the first subject image, comparing each of a plurality of object points, and deriving a representation of the position and color are completed for each of the individual time instances.

30. The method of claim 24, wherein the representation includes a shape and a color for the first image and a shape and a color of the second image.

* * * * *

UNITED STATES PATENT AND TRADEMARK OFFICE
CERTIFICATE OF CORRECTION

| | |
|---|---|
| PATENT NO. | : 7,307,654 B2 |
| APPLICATION NO. | : 10/285969 |
| DATED | : December 11, 2007 |
| INVENTOR(S) | : Nelson Liang An Chang |

It is certified that error appears in the above-identified patent and that said Letters Patent is hereby corrected as shown below:

In column 13, line 52, in Claim 18, insert -- , -- before "the second".

In column 13, line 53, in Claim 18, after "background" insert -- , --.

In column 14, line 32, in Claim 22, after "background" insert -- , --.

Signed and Sealed this

Twenty-second Day of July, 2008

JON W. DUDAS
*Director of the United States Patent and Trademark Office*